(12) United States Patent
Doi et al.

(10) Patent No.: US 6,261,353 B1
(45) Date of Patent: Jul. 17, 2001

(54) RECORDING MATERIAL AND IMAGE FORMING METHOD USING THE SAME

(75) Inventors: Takatsugu Doi; Atsushi Suzuki; Kunichi Yamashita; Yoshiro Yamashita; Hiroshi Inoue; Ken Hashimoto, all of Kanagawa (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/320,733

(22) Filed: May 27, 1999

(30) Foreign Application Priority Data

May 29, 1998 (JP) .................................................. 10-166031
Jun. 8, 1998 (JP) .................................................. 10-176718

(51) Int. Cl.⁷ .................................................. C09D 11/02
(52) U.S. Cl. .................. 106/31.6; 106/31.65; 106/31.86; 106/31.89; 106/31.9
(58) Field of Search .............................. 106/31.6, 31.65, 106/31.86, 31.89, 31.9

(56) References Cited

U.S. PATENT DOCUMENTS

| | | | |
|---|---|---|---|
| 5,085,698 | 2/1992 | Ma et al. | 106/31.6 |
| 5,172,133 | 12/1992 | Suga et al. | 106/31.6 |
| 5,221,334 | 6/1993 | Ma et al. | 106/31.6 |
| 5,549,740 * | 8/1996 | Takahashi et al. | 106/31.43 |
| 5,571,311 | 11/1996 | Belmont et al. | 106/31.6 |
| 5,618,338 * | 4/1997 | Kurabayashi et al. | 106/31.37 |
| 5,624,484 * | 4/1997 | Takahashi et al. | 106/31.86 |
| 5,805,190 * | 9/1998 | Tsuchii et al. | 347/100 |
| 5,985,975 * | 11/1999 | Kurabayashi et al. | 106/31.88 |
| 6,020,397 * | 2/2000 | Matzinger | 523/160 |
| 6,059,868 * | 5/2000 | Kasperchik | 106/31.6 |
| 6,084,619 * | 7/2000 | Takemoto et al. | 106/31.72 |

FOREIGN PATENT DOCUMENTS

| | | |
|---|---|---|
| 0534634 * | 3/1993 | (EP) . |
| 0663299 * | 7/1995 | (EP) . |
| 5-202328 | 8/1993 | (JP) . |
| 8-3498 | 1/1996 | (JP) . |
| 08/020162 * | 1/1996 | (JP) . |
| 8-193175 | 7/1996 | (JP) . |
| 08/207421 * | 8/1996 | (JP) . |
| 8-197840 | 8/1996 | (JP) . |
| 2675001 | 7/1997 | (JP) . |
| 9-207424 | 8/1997 | (JP) . |
| 9-286940 | 11/1997 | (JP) . |
| 10-237372 * | 9/1998 | (JP) . |

OTHER PUBLICATIONS

Derwent abstract of JP08/207421, Aug. 1996.*
Derwent abstract of JP08/020162, Jan. 1996.*
Derwent abstract of JP10/237372 Sep. 1998.*

* cited by examiner

*Primary Examiner*—Helene Klemanski
(74) *Attorney, Agent, or Firm*—Finnegan, Henderson, Farabow, Garrett & Dunner, L.L.P.

(57) ABSTRACT

A recording material is disclosed, comprising a colorless or pale solution containing an electrolyte, a water-soluble organic solvent and water, and an ink containing a pigment, an anionic compound, a water-soluble organic solvent and water, wherein the number of particles of 0.5 μm or more present in 1 L of the recording material is $1 \times 10^{11}$ or more, and the number of particles of 5 μm or more is $1 \times 10^9$ or more. Also disclosed is an image forming method using the recording material.

18 Claims, No Drawings

RECORDING MATERIAL AND IMAGE FORMING METHOD USING THE SAME

FIELD OF THE INVENTION

The present invention relates to a recording material and an image forming method using the same, more specifically, the present invention relates to a recording material comprising a colorless or pale solution and an ink containing a pigment, and also relates to an image forming method using the recording material.

BACKGROUND OF THE INVENTION

Printers in a so-called ink jet system where a liquid or fused solid ink is ejected from nozzle, slit, porous film or the like to make recording on paper, cloth or film are advantageous in that the printer is compact, inexpensive and noiseless. Accordingly, a large number of printers in this system are commercially available. Among these, a so-called piezo-ink jet system using a piezoelectric element and a so-called thermal ink jet system of forming droplets by the action of heat energy and thereby performing recording have many advantages, for example, capabilities of high speed printing and high resolution.

Conventional ink jet recording systems commonly employs an ink using a water-soluble dye. This ink has excellent long-term storage stability but has a problem in the water resistance and light fastness. On the other hand, an ink using a pigment exhibits excellent resistance against water or light and at the same time, ensures formation a high density image free of blurring. Accordingly, this ink is very promising and a large number of proposals have been made thereon and put into practice in recent years.

For example, JP-A-56-147871 proposes a recording solution comprising an aqueous medium containing a pigment, a polymer dispersant and a nonionic surfactant, U.S. Pat. Nos. 5,085,698 and 5,221,334 propose to use an AB or BAB block copolymer as a dispersant for the pigment, and U.S. Pat. No. 5,172,133 proposes to use a specific pigment, a specific water-soluble resin and a specific solvent. On the other hand, with respect to the method for dispersing a pigment using no dispersant, U.S. Pat. No. 5,571,311 proposes a method of introducing a substituent containing a water solubilizing group into carbon black, JP-A-8-81646 proposes a method of polymerizing a water-soluble monomer or the like on the surface of carbon black, and JP-A-8-3498 proposes a method of acidifying carbon black.

In general, an ink using a pigment is known to have a problem in the image fixing property. A method of elevating the ink fixing property by adding a surfactant into an ink is described in JP-A-55-65269, however; if this method is applied to an ink using a pigment, although the image fixing property may be improved, there arises a problem that a sufficiently high image density cannot be obtained.

JP-A-5-202328 describes a method of insolubilizing a dye or the like by the action of a liquid containing a multivalent metal salt, however, if this method is applied to an ink using an ink, although a high image density may be obtained, there arises a problem that the image fixing property deteriorates.

Furthermore, JP-A-8-193175 describes a method of combining a liquid composition containing a cationic substance and a nonionic substance with an ink containing an anionic compound, where the coloring material is aggregated by the cationic substance, the aggregate produced is adsorbed to a nonionic polymer substance, and thereby the coloring material is fixed in the recording medium. According to this method, both the fixing property and the optical density can be satisfied simultaneously. JP-A-8-197840 and JP-A-9-286940 described methods similar to this method.

However, none of these methods can succeed in obtaining a recording material having high optical density, excellent image fixing property, good long-term storage stability and superior jetting stability.

SUMMARY OF THE INVENTION

Accordingly, the object of the present invention is to provide a recording material exhibiting high optical density, excellent image fixing property, good long-term storage stability and superior jetting stability on use with a pigment ink.

As a result of extensive investigations, the present inventors have found that in a recording material comprising a combination of a colorless or pale solution containing predetermined components with an ink containing predetermined components, the above-described objects can be attained by establishing a constant relationship between the particle size and the number of particles contained in the recording material. The present invention has been accomplished based on this finding.

More specifically, the present invention provides a recording material comprising a colorless or pale solution containing an electrolyte, a water-soluble organic solvent and water, and an ink containing a pigment, an anionic compound, a water-soluble organic solvent and water, wherein the number of particles of 0.5 $\mu$m or more present in 1 1 of the recording material is $1\times10^{11}$ or more, and the number of particles of 5 $\mu$m or more is $1\times10^{11}$ or more, and also provides an image forming method using the recording material.

DETAILED DESCRIPTION OF THE INVENTION

The present invention is described in detail below.

The recording material of the present invention is constituted by a colorless or pale solution and an ink. The colorless or pale solution and the ink are described in detail below.

A Colorless or Pale Solution

The "colorless or pale solution" constituting the recording material of the present invention is described below. The "colorless or pale solution" as used in the present invention means a solution in which the average in the absorbance at from 400 to 750 nm determined using a spectrophotometer is 2 or less. The spectrophotometer used for the measurement is an automatic spectrophotometer Model U-3210 (manufactured by Hitachi Ltd.).

(Components of Colorless or Pale Solution)

The colorless or pale solution in the recording material of the present invention contains an electrolyte, a water-soluble organic solvent and water as essential components. In addition, the colorless or pale solution may contain a carboxylic acid or a salt of carboxylic acid, a property controlling agent and various additives. Respective components are described below.

1. Electrolyte

Examples of the electrolyte for use in the colorless or pale solution of the present invention include salts of an alkali metal ion such as lithium ion, sodium ion and potassium ion, or a multivalent metal ion such as aluminum ion, barium ion, calcium ion, copper ion, iron ion, magnesium ion, manganese ion, nickel ion, tin ion, titanium ion and zinc ion, with hydrochloric acid, bromic acid, hydroiodic acid, sulfuric acid, nitric acid, phosphoric acid, thiocyanic acid or an organic carboxylic or sulfonic acid such as acetic acid, oxalic acid, lactic acid, fumaric acid, citric acid, salicylic acid and benzoic acid. In addition, a cationic substance or the like which dissociates in water and becomes an organic cation may be used. Specific examples thereof include primary, secondary, tertiary or quaternary amine and salts thereof.

Specific examples of the salt which can be used as the electrolyte in the present invention include alkali metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate and potassium benzoate; and multivalent metal salts such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate and zinc acetate.

Specific examples of the cationic substance which can be used as the electrolyte in the present invention include tetraalkylammonium salts, alkylamine salts, benzalkonium salts, alkylpyridium salts, imidazolium salts and polyamine salts, such as isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolamine, triethanolamine, tetramethylammonium chloride, tetraethylammonium bromide, dihydroxyethyl-stearylamine, 2-heptadecenyl-hydroxyethylimidazoline, lauryldimethylbenzylammonium chloride, cetylpyridinium chloride, stearamidemethylpyridium chloride, diallyl-dimethylammonium chloride polymer, diallylamine polymer and monoallylamine polymer.

Among these electrolytes preferred are aluminum sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate, aluminum nitrate, monoallyl-amine polymer, diallylamine polymer and diallyldimethyl-ammonium chloride polymer.

The electrolytes may be used either individually or in combination of two or more thereof. The electrolyte content in the colorless or pale solution is preferably from 0.1 to 15 wt %, more preferably from 0.5 to 10 wt %. If the electrolyte content is less than 0.1 wt %, the optical density may decrease, whereas if it exceeds 15 wt %, a satisfactory image fixing property may not be obtained.

2. Water-Soluble Organic Solvent

Examples of the water-soluble organic solvent for use in the colorless or pale solution of the present invention include polyhydric alcohols such as ethylene glycol, diethylene glycol, propylene glycol, butylene glycol, triethylene glycol, 1,5-pentanediol, 1,2,6-hexanetriol and glycerin; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether and dipropylene glycol monobutyl ether; nitrogen-containing solvents such as pyrrolidone, N-methyl-2-pyrrolidone, cyclohexylpyrrolidone and triethanolamine; alcohols such as ethanol, isopropyl alcohol, butyl alcohol and benzyl alcohol; sulfur-containing solvents such as thiodiethanol, thiodiglycerol, sulfolane and dimethylsulfoxide; propylene carbonate; and ethylene carbonate.

The water-soluble organic solvent for use in the colorless or pale solution may be used either individually or in combination of two or more thereof. From these water-soluble organic solvents for use in the ink, a suitable solvent is preferably selected by taking account of the combination with pigment, anionic compound and the like.

The content of the water-soluble organic solvent in the colorless or pale solution is preferably from 1 to 60 wt %, more preferably from 5 to 40 wt %. If the content is less than 1 wt %, the long-term storage stability may be low, whereas if it exceeds 60 wt %, the jetting stability may be deteriorated and abnormal jetting may occur in some cases.

3. Water

As the water contained in the colorless or pale solution used in the recording material of the present invention, ion exchanged water, distilled water, pure water or ultrapure water may be used.

The content of water in the colorless or pale solution for use in the present invention is preferably from 15 to 98 wt %, more preferably from 45 to 90 wt %. If the content of water is less than 15 wt %, the jetting stability may be deteriorated and abnormal jetting may occur in some cases, whereas if it exceeds 98 wt %, the long-term storage stability may be impaired.

4. Surfactant

The colorless or pale solution for use in the recording material of the present invention may contain a surfactant.

The surfactant which can be used in the colorless or pale solution for use in the recording material of the present invention includes various anionic surfactants, nonionic surfactants, cationic surfactants and amphoteric surfactants.

Examples of the anionic surfactant include alkylbenzene sulfonate, alkylphenyl sulfonate, alkyl-naphthalene sulfonate, higher fatty acid salt, sulfate of higher fatty acid ester, sulfonate of higher fatty acid ester, sulfate or sulfonate of higher alcohol ether, higher alkyl sulfosuccinate, higher alkyl phosphate and phosphate of higher alcohol ethylene oxide adduct. Specific examples thereof include dodecylbenzene sulfonate, kerylbenzene sulfonate, isopropylnaphthalene sulfonate, monobutyl-phenylphenol monosulfonate, monobutylbiphenyl sulfonate and dibutylphenylphenol disulfonate.

Examples of the nonionic surfactant include propylene glycol ethylene oxide adduct, polyoxyethylene nonylphenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, oxyethylene adduct of acetylene glycol, aliphatic alkanolamide, glycerin ester and sorbitan ester.

Examples of the cationic surfactant include tetraalkylammonium salt, alkylamine salt, benzalkonium salt, alkylpyridium salt and imidazolium salt, such as dihydroxyethylstearylamine, 2-heptadecenyl-hydroxyethylimidazoline, lauryldimethylbenzylammonium chloride, cetylpyridinium chloride and stearamidemethylpyridium chloride.

Other than these, silicone-based surfactant such as polysiloxane oxyethylene adduct, fluorine-based surfactant such as perfluoroalkyl carboxylate, perfluoroalkyl sulfonate and oxyethylene perfluoroalyl ether, and bio-surfactant such as spiculisporic acid, rhamnolipid and resorcitin.

Among these surfactants, nonionic surfactant and cationic surfactant are preferred, and acetylene glycol, acetylene glycol ethylene oxide and polyoxyethylene alkyl ether are more preferred.

These surfactants may be used either individually or in combination of two or more thereof.

The surfactant preferably has a weight average molecular weight of less than 5,000, more preferably less than 2,000. If the molecular weight is 5,000 or more, the image fixing property is deteriorated in some cases. This is considered to occur because permeating force into paper decreases.

The content of the surfactant in the colorless or pale solution is preferably less than 10 wt %, more preferably from 0.1 to 5 wt %. If the amount added exceeds 10 wt %, the optical density may decrease.

5. Other Components

1) Carboxylic Acid or Salt of Carboxylic Acid

The colorless or pale solution for use in the recording material of the present invention may contain a carboxylic acid or a salt of carboxylic acid. Specific examples of the carboxylic acid or a salt of carboxylic acid include formic acid, acetic acid, propionic acid, butyric acid, valeric acid, lactic acid, tartaric acid, benzoic acid, acrylic acid, crotonic acid, butenoic acid, methacrylic acid, tiglic acid, allylic acid, 2-ethyl-2-butenoic acid, oxalic acid, malonic acid, succinic acid, glutaric acid, maleic acid, fumaric acid, methylmaleic acid, glyceric acid, a copolymer of a monomer having an ethylenically unsaturated group and an unsaturated carboxylic acid such as styrene-acrylic acid copolymer, a derivative of those carboxylic acids, and an alkali metal salt, an alkaline earth metal salt and an ammonium salt thereof. Among these, acetic acid, salicylic acid, lactic acid, benzoic acid, acrylic acid, methacrylic acid, a derivative thereof and a salt thereof are preferred.

When the colorless or pale solution for use in the present invention contains a carboxylic acid or a salt of carboxylic acid, the long-term storage stability and jetting stability in an ink jet head can be improved. This is considered to result from the effect such that the inorganic solution absorbs carbon dioxide in air with the passage of time and inhibits the multivalent metal ion from forming a water-insoluble salt. In employing a thermal ink jet system where the multivalent metal ion is known to deteriorate the heater part with the passage of time, another effect of preventing the heater part from deterioration seems to be brought out.

The content of the carboxylic acid or a salt of carboxylic acid in the colorless or pale solution is preferably 10 wt % or less, more preferably from 0.1 to 10 wt %.

2) Property Controlling Agent

The colorless or pale solution may further contain various property controlling agents such as polyethyleneimine, polyamines, polyvinyl pyrrolidone, polyethylene glycol, cellulose derivatives such as ethyl cellulose and carboxymethyl cellulose, polysaccharides and derivatives thereof, other water-soluble polymers, polymer emulsions such as acrylic polymer emulsion and polyurethane-based emulsion, cyclodextrin, large ring amines, dendrimer, crown ethers, urea and derivatives thereof, and acetamide. Furthermore, for adjusting the conductivity and pH, the colorless or pale solution may contain an alkali metal compound such as potassium hydroxide, sodium hydroxide and lithium hydroxide, a nitrogen-containing compound such as ammonium hydroxide, triethanolamine, diethanolamine, ethanolamine and 2-amino-2-methyl-1-propanol, an alkaline earth metal compound such as calcium hydroxide, an acid such as sulfuric acid, hydrochloric acid and nitric acid, or a strong acid or weak alkali salt such as ammonium sulfate.

The content of the property controlling agent in the colorless or pale solution is preferably from 0.1 to 20 wt %.

3) Other Additives

If desired, the colorless or pale solution may further contain a pH buffer, an antioxidant, an fungicide, a viscosity adjusting agent, an electrically conducting agent, an ultraviolet absorbent, a chelating agent, a water-soluble dye, a disperse dye or an oil-soluble dye. The content of such an additive in the colorless or pale solution is preferably 20 wt % or less. (Production Method of Colorless or Pale Solution)

The colorless or pale solution may be obtained, for example, by mixing and dissolving the above-described components and filtering the mixed solution through a filter of about 0.45 µm.

(Electric Conductivity of Colorless or Pale Solution)

The colorless or pale solution preferably has an electric conductivity of from 0.5 to 3.0 S/m, more preferably from 0.8 to 2.0 S/m. If the electric conductivity exceeds 3.0 S/m, satisfactory image fixing property and sufficiently high jetting stability may not be obtained. Poor fixing property is considered to result because the aggregation of pigment is accelerated and the pigment can difficulty permeate into the recording medium. The cause for the deterioration in jetting property is considered as follows. When printing is performed using a print head of thermal ink jet system, small leaks of current readily take place in the periphery of the heater and therefore, the periphery of the heater is accelerated. On the other hand, if the electric conductivity is less than 0.5 S/m, a sufficiently high optical density may not be obtained. Insufficient aggregation of the pigment or permeation of the pigment or pigment aggregate into the recording medium seems to be responsible for this.

B Ink

The "ink" constituting the recording material of the present invention is described below.

(Components of Ink)

The ink for use in the recording material of the present invention essentially consists of a pigment, an anionic compound, a water-soluble organic solvent and water, but may additionally contain a pigment dispersant, a surfactant, a property controlling agent and various additives. Respective components are described below.

1. Pigment

The pigment for use in the ink used in the recording material of the present invention may be either an organic pigment or an inorganic pigment. With respect to the pigment color, not only a black pigment and three primary color pigment of cyan, magenta and yellow but also a pigment having a specific color such as red, green, blue, brown or white, a metal gloss pigment such as gold and silver, a colorless or pale colored extender pigment, or a plastic pigment may be used. A pigment newly synthesized for the present invention may also be used.

Examples of the black pigment include carbon black pigments such as furnace black, lamp black, acetylene black and channel black. Specific examples thereof include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, Raven 1060 (all produced by Columbian Carbon), Regal 400R, Regal 1330R, Regal 1660R, Mogul L, Black Pearls L, Monarch 700, Monarch 800, Monarch 880, Monarch 900, Monarch 1000, Monarch 1100, Monarch 1300, Monarch 1400 (all produced by Cabot Corp.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all produced by DEGUSSA), No. 25, No. 33, No. 40, No. 47, No. 52, No. 900, No. 2300, MCF-88, MA600, MA7, MA8 and MA100 (all produced by Mitsubishi Chemical Corporation).

It is difficult to indiscriminately discuss the suitable structure of carbon black, however, the carbon black preferably has a structure such that the particle size is from 15 to 30 nm, the BET specific area is from 70 of 300 $m^2/g$, the DBP absorption number is from 0.5 to $1.0 \times 10^{-3}$ L/g, the volatile matter is from 0.5 to 10 wt %, and the ash content is from 0.01 to 1.0 wt %. If carbon black having a structure outside this range is used, the dispersed particle size may increase in the ink.

Specific examples of the cyan color pigment include C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

Specific examples of the magenta color pigment include C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184 and C.I. Pigment Red 202.

Specific examples of the yellow color pigment include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154.

The pigment which can be used in the present invention may be self-dispersible in water. The pigment self-dispersible in water means a pigment having many water solubilizing groups on the pigment surface and capable of stably dispersing even in the absence of a pigment dispersant. More specifically, the pigment self-dispersible in water can be obtained by subjecting an ordinary pigment to surface modification such as treatment with an acid or base, treatment with a coupling agent, polymer graft treatment, plasma treatment or oxidation/reduction treatment. In addition to the pigments treated for surface modification, commercially available pigments such as Cab-o-jet-200, Cab-o-jet-300, IJX-55 (all produced by Cabot Corp.), Microjet Black CW-1 produced by Orient Kagaku, and pigments available from Nippon-Shokubai may also be used.

The criteria of the judgement whether or not the pigment is self-dispersible in water include a requirement that when a mixture having a water/pigment concentration of 95 wt %/5 wt % is dispersed without using a dispersant in a dispersing apparatus such as ultrasonic homogenizer, nanomizer, microfluidizer or ball mill, the initial pigment concentration is measured, the dispersion solution in a glass bottle is left standing for one day, and the pigment concentration in the supernatant is measured, the concentration in the supernatant must be 98% or more of the initial concentration.

The water solubilizing group present on the surface of a pigment self-dispersible in water may be any of nonionic, cationic and anionic groups, however, a sulfonic acid, a carboxylic acid, a hydroxyl group and a phosphoric acid are preferred. In the case of a sulfonic acid, a carboxy acid and a phosphoric acid, the acid may be used as it is in the free acid state but is preferably used in the form of a salt with a basic compound so as to increase the water solubility. In this case, examples of the basic compound which can be used include alkali metals such as sodium, potassium and lithium, aliphatic amines such as monomethylamine, dimethylamine and triethylamine, alcohol-amines such as monomethanolamine, monoethanolamine, diethanolamine, triethanolamine and diisopropanolamine, and ammonia. Among these, alkali metal basic compounds such as sodium, potassium and lithium are preferred, because the alkali metal basic compound is a strong electrolyte and is considered to have a great effect of accelerating dissociation of an acidic group.

The pigment content in the ink is preferably from 0.5 to 20 wt %, more preferably from 2 to 10 wt %. If the pigment content is less than 0.5 wt %, the optical density may decrease, whereas if it exceeds 20 wt %, the image fixing property may be deteriorated.

2. Anionic Compound

Examples of the anionic compound for use in the ink used in the recording material of the present invention include acids such as carboxylic acid and sulfonic acid, derivatives thereof, and anionic polymer emulsions. An anionic pigment dispersant which will be described later may also be used.

Specific examples of the carboxylic acid include formic acid, acetic acid, propionic acid, butyric acid, valeric acid, lactic acid, tartaric acid, benzoic acid, acrylic acid, crotonic acid, butenoic acid, methacrylic acid, tiglic acid, allylic acid, 2-ethyl-2-butenoic acid, oxalic acid, malonic acid, succinic acid, glutaric acid, maleic acid, fumaric acid, methylmaleic acid, glyceric acid, and their polymers and derivatives. These compounds may also be used in the form of an alkali metal salt, an alkaline earth metal salt or an ammonium salt.

Specific examples of the sulfonic acid include sulfonic acid and derivatives thereof such as benzene-sulfonic acid, toluenesulfonic acid, xylenesulfonic acid, benzenesulfonic acid, benzenetrisulfonic acid, hydroxy-benzenesulfonic acid, chlorobenzenesulfonic acid, bromo-benzenesulfonic acid, 4-hydroxy-1,3-benzenedisulfonic acid, sodium 4,5-dihydroxybenzene-1,3-disulfonate and o-aminobenzenesulfonate, and an alkali metal salt, an alkaline earth metal salt and an ammonium salt thereof.

These compounds are also preferably used in the form of a salt with a basic compound so as to increase the water solubility. Examples of the basic compound capable of forming a salt with the above-described compounds include alkali metals such as sodium, potassium and lithium, aliphatic amines such as monomethylamine, dimethylamine and triethylamine, alcoholamines such as monomethanolamine, monoethanolamine, diethanolamine, triethanolamine and diisopropanolamine, and ammonia. Among these, alkali metal basic compounds such as sodium, potassium and lithium are preferred, because the alkali metal basic compound is a strong electrolyte and is considered to have a great effect of accelerating dissociation of an acidic group.

More preferred specific examples of the anionic compound include an acrylic acid alkyl ester-acrylic acid copolymer, a styrene-methacrylic acid alkyl ester-methacrylic acid copolymer, a styrene-maleic acid copolymer, a styrene-methacrylic acid copolymer, a styrene-acrylic acid copolymer, a methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, and salts and derivatives of these copolymers.

The anionic compound contained in the ink preferably has a structure comprising a hydrophilic group and a hydrophobic group, more preferably contains a carboxylic acid or a salt of carboxylic acid as a hydrophilic functional group. This is because, it is considered, the carboxyl group forms a cross-linked structure with multivalent metal ion and thereby the pigment can have an appropriately aggregated structure.

These anionic compounds, may be used either individually or in combination of two or more thereof. The content of the anionic compound in the ink is preferably from 0.1 to 10 wt %, more preferably from 0.3 to 5 wt %. If the anionic compound content is less than 0.1 wt %, the long-term storage stability may be deteriorated or the optical density may decrease, whereas if it exceeds 10 wt %, abnormal jetting may occur in some cases or the optical density may decrease.

3. Water-Soluble Organic Solvent

The water-soluble organic solvent for use in the ink used in the recording material of the present invention may be the same as the water-soluble organic solvent used in the colorless or pale solution described above.

The content of the water-soluble organic solvent in the ink is preferably from 1 to 60 wt %, more preferably from 5 to 40 wt %. If the water-soluble organic solvent content is less than 1 wt %, the long-term storage stability may be deteriorated, whereas if it exceeds 60 wt %, the jetting stability may be impaired and abnormal jetting may occur in some cases.

4. Water

As the water for use in the ink used in the recording material of the present invention, ion exchanged water, distilled water, pure water or ultrapure water may be used.

The content of water in the ink is preferably from 1 to 98 wt %, more preferably from 40 to 93 wt %. If the content of water is less than 1 wt %, the jetting stability may be deteriorated and abnormal jetting may occur in some cases, whereas if it exceeds 98 wt %, the long-term storage stability may be impaired.

5. Other Components

1) Pigment Dispersant

For dispersing a pigment in the ink, a pigment dispersant may be used. Specific example of the pigment dispersant include a polymer dispersant, an anionic surfactant, a cationic surfactant, an amphoteric surfactant and a nonionic surfactant. Among these pigment dispersants, the pigment dispersants which become an organic anion upon electrical dissociation in water are called an anionic pigment dispersant in the present invention. This anionic pigment dispersant may be used as an anionic compound in the ink.

As the polymer dispersant, any polymer may be effectively used as far as it has a hydrophilic structural group and a hydrophobic structural group. Examples of the polymer having a hydrophilic structural group and a hydrophobic structural group includes a condensation-type polymer and an addition polymer. Examples of the condensation-type polymer include known polyester-based dispersants. Examples of the addition polymer include addition polymers of a monomer having an α, β, -ethylenically unsaturated group. An objective polymer dispersant may be obtained by appropriately combining and copolymerizing a monomer having a hydrophilic group and having an α, β-ethylenically unsaturated group with a monomer having a hydrophobic group and having an α, β-ethylenically unsaturated group. A homopolymer of a monomer having a hydrophilic group and having an α, β-ethylenically unsaturated group may also be used.

Examples of the monomer having a hydrophilic group and having an α, β-ethylenically unsaturated group include monomers having a carboxyl group, a sulfonic acid group, a hydroxyl group or a phosphoric acid group, such as acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinyl naphthalene, vinyl alcohol, acrylamide, methacryloxyethyl phosphate, bis-methacryloxyethyl phosphate, methacryloxyethylphenyl acid phosphate, ethylene glycol dimethacrylate and diethylene glycol dimethacrylate.

Examples of the monomer having a hydrophobic group and an α, β-ethylenically unsaturated group include styrene derivatives such as styrene, α-methylstyrene and vinyltoluene, vinylcyclohexane, vinylnaphthalene, vinylnaphthalene derivatives, acrylic acid alkyl ester, acrylic acid phenyl ester, methacrylic acid alkyl ester, methacrylic acid phenyl ester, methacrylic acid cycloalkyl ester, crotonic acid alkyl ester, itaconic acid dialkyl ester and maleic acid dialkyl ester.

Preferred examples of the copolymer formed from these monomers include a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an acrylic acid alkyl ester-acrylic acid copolymer, a methacrylic acid alkyl ester-methacrylic acid copolymer, a styrene-methacrylic acid alkyl ester-methacrylic acid copolymer, a styrene-acrylic acid alkyl ester-acrylic acid copolymer, a styrene-methacrylic acid phenyl ester-methacrylic acid copolymer and a styrene-methacrylic acid cyclohexyl ester-methacrylic acid copolymer.

These polymers each may be appropriately copolymerized with a monomer having a polyoxyethylene group or a hydroxyl group. Furthermore, a monomer having a cationic functional group may also be appropriately copolymerized so as to elevate the affinity for the pigment having an acidic functional group on the surface and thereby improve the dispersion stability. Examples of the monomer having a cationic functional group include N,N-dimethylaminoethyl methacrylate, N,N-dimethylaminoethyl acrylate, N,N-dimethylaminomethacrylamide, N,N-dimethylaminoacrylamide, N-vinylpyrrole, N-vinylpyridine, N-vinylpyrrolidone and N-vinylimidazole.

These copolymers may have any structure of random, block and graft copolymers. In addition, a polystyrenesulfonic acid, a polyacrylic acid, a polymethacrylic acid, a polyvinylsulfonic acid, a polyalginic acid, a polyoxyethylene-polyoxypropylene-polyoxyethylene block copolymer, a formalin condensate of naphthalenesulfonic acid, a polyvinylpyrrolidone, a polyethyleneimine, polyamines, polyamides, a polyvinylimidazoline, an aminoalkyl acrylate-acrylamide copolymer, a polyoxyethylene fatty acid amide, a polyvinyl alcohol, a polyacrylamide, cellulose derivatives such as carboxymethyl cellulose and carboxyethyl cellulose, polysaccharides, and derivatives thereof may be used.

Although not particularly limited, the hydrophilic group of the pigment dispersant is preferably a carboxylic acid or a salt of carboxylic acid. This is because, it is considered, the carboxyl group forms a cross-linked structure with multivalent metal ion and thereby the pigment can have an appropriately aggregated structure.

Among these polymers, the polymers in which the hydrophilic group is an acidic group are preferably used in the form of a salt with a basic compound so as to increase water solubility. Examples of the basic compound capable of forming a salt with the above-described polymers include alkali metals such as sodium, potassium and lithium, aliphatic amines such as monomethylamine, dimethylamine and triethylamine, alcoholamines such as monomethanolamine, monoethanolamine, diethanolamine, triethanolamine and diisopropanolamine, and ammonia. In particular, alkali metal basic compounds such as sodium, potassium and lithium are preferred because the alkali metal basic compound is a strong electrolyte and has a great effect of accelerating dissociation of an acidic group.

The amount of the pigment dispersant neutralized is preferably 50% or more, more preferably 80% or more, based on the acid value of the copolymer.

The pigment dispersant preferably has a molecular weight in terms of the weight average molecular weight of from 2,000 to 15,000, more preferably from 3,500 to 10,000. The structures of and the composition ratio between the hydrophobic group and the hydrophilic group are selected appropriately from the combinations of a pigment and a solvent.

The above-described pigments dispersants may be used either individually or in combination of two or more thereof. The amount of the pigment dispersant added greatly varies depending on the pigment and cannot be indiscriminately specified, however, it is generally from 0.1 to 100 wt %, preferably from 1 to 70 w%, more preferably from 3 to 50 wt %, based on the pigment. 2) Surfactant The ink may contain a surfactant so as to adjust the surface tension or wettability of the pigment dispersant and the ink or to solubilize organic impurities and thereby improve the jetting reliability. Examples of the kind of the surfactant include those described above as an essential component surfactant of the colorless or pale solution. The surfactants for use in the ink may be used either individually or in combination of two or more thereof. The amount of the surfactant added is preferably 10 wt % or less, more preferably from 0.01 to 5 wt %. If the amount added exceeds 10 wt %, the optical density may be reduced.

3) Property Controlling Agent

For controlling the properties of ink, those described above as a property controlling agent of the colorless or pale solution may be used. The amount of the property controlling agent contained in the ink is preferably from 0.1 to 20 wt %.

4) Other Additives

If desired, the ink may further contain a pH buffer, an antioxidant, an fungicide, a viscosity adjusting agent, an electrically conducting agent, an ultraviolet absorbent, a chelating agent, a water-soluble dye, a disperse dye or an oil-soluble dye. The amount of such an additive added to the ink is preferably 20 wt % or less.

Production Method of Ink

The ink as a component of the recording material of the present invention may be obtained, for example, by adding a predetermined amount of pigment to an aqueous solution containing a predetermined amount of pigment dispersant, thoroughly stirring the mixed solution, dispersing the mixture using a disperser, removing coarse particles by centrifugal separation or the like, adding and then mixing prescribed solvent and additives under stirring, and finally filtering the resulting solution. At this time, a method of preparing a thick pigment dispersion and diluting it at the preparation of ink may also be used. A step for pulverizing the pigment may be provided before the dispersion. Or, the pigment may be added and dispersed using a disperser after the prescribed solvent, water and pigment dispersant are mixed.

The disperser may be a commercially available disperser. Examples thereof include colloid mill, flow jet mill, slusher mill, high-speed disperser, ball mill, attritor, sand mill, sand grinder, ultrafine mill, Eiger Motor mill, Dynomill, pearl mill, agitator mill, co-ball mill, triple screw roll, twin screw roll, extruder, kneader, microfluidizer, laboratory homogenizer and ultrasonic homogenizer. These may be used either individually or in combination of two or more thereof. In order to prevent mingling of inorganic impurities, a dispersion method using no dispersion medium is preferred and to this effect, microfluidizer, ultrasonic homogenizer and the like are preferably used. In the Examples of the present invention, an ultrasonic homogenizer was used for the dispersion.

On the other hand, the ink using a pigment self-dispersible in water may be obtained by subjecting a pigment to surface modification, adding water to the pigment obtained, thoroughly mixing the mixed solution, dispersing, if desired, the resulting solution by the same disperser as described above, removing coarse particles by centrifugal separation, adding prescribed solvent and additives, and then stirring, mixing and filtering the mixture.

pH of Ink

The pH of ink as a component of the recording material of the present invention is preferably from 3 to 11, more preferably from 4.5 to 9.5. In the case of an ink having an anionic free radical on the pigment surface, the ink preferably has a pH of from 6 to 11, more preferably from 6 to 9.5, still more preferably from 7.5 to 9.0. In the case of an ink having a cationic free radical on the pigment surface, the ink preferably has a pH of from 4.5 to 8.0, more preferably from 4.5 to 7.0.

Viscosity of Ink

The ink as a component of the recording material of the present invention preferably has a viscosity of from 1.5 to 6.0 mPa.s, more preferably from 1.5 to 4.0 mPa.s. If the viscosity of the ink exceeds 6.0 mPa.s, a sufficiently high image fixing property may not be obtained and this seems to occur because the permeability into the recording medium decreases and the pigment or pigment aggregate remains in the vicinity of the surface of the recording medium. On the other hand, if the viscosity of the ink is less than 1.5 mPa.s, a sufficiently high optical density may not be obtained and this seems to occur because the permeability into the recording medium increases and the pigment or pigment aggregate permeates into the inside of the recording medium.

Number Average Particle Size and Volume Average Particle Size of Dispersed Particles in Ink The number average particle size of dispersed particles in the ink is preferably from 15 to 100 nm, more preferably from 15 to 80 nm, still more preferably from 20 to 70 nm. The volume average particle size is preferably from 30 to 200 nm, more preferably from 30 to 170 nm, still more preferably from 30 to 150 nm. The number average particle size and the volume average particle size of dispersed particles in the ink are substantially those of the pigment in the ink.

As far as the dispersed particles in the ink have a number average particle size or a volume average particle size within the above-described range, high optical density and excellent image fixing property can be obtained. If the number average particle size of dispersed particles in ink exceeds 100 nm or the volume average particle size exceeds 200 nm, the optical density becomes poor and this seems to result because as the dispersed particle size increases, the particle size of the pigment aggregate also increases and a sufficiently high optical density cannot be obtained. In general, it is known that a pigment having a large primary particle size is inferior in the staining power. On the other hand, if the number average particle size of dispersed particles in the ink is less than 15 nm or the volume number average particle size is less than 30 nm, the ink viscosity increases and nozzle clogging is readily caused.

In the present invention, the apparatus used for measuring the number average particle size and the volume average particle size was Microtrack UPA Particle Size Analyzer 9340 (manufactured by Leeds & Northrup). This apparatus determines the particle size making use of the Brownian movement of the dispersoid, in which a laser ray is irradiated on the solution and the scattered light is detected to thereby measure the particle size. The measurement was performed by placing 4 ml of ink in a measurement cell according to a prescribed measuring method. The viscosity and the density of dispersed particles as the parameters inputted at the measurement are the viscosity of ink and the density of pigment, respectively.

C Recording Material of the Invention

The recording material of the present invention comprises the above-described colorless or pale solution and ink.

The recording material of the present invention has a characteristic feature that the number of particles having a particle size of 0.5 $\mu$m or more present in 1 l of the recording material is $1 \times 10^{11}$ or more and the number of particles having a particle size of 5 $\mu$m or more present in 1 l of the recording material is $1 \times 10^9$ or more. With the particle size in this range, the effect of the present invention can be obtained. If the number of particles having a particle size of 0.5 $\mu$m or more present in 1 l of the recording material is less than $1 \times 10^{11}$ or the number of particles having a particle size of 5 $\mu$m or more present in 1 l of the recording material is less than $1 \times 10^9$, the optical density may decreases even though the image fixing property is satisfied or the image fixing property may be deteriorated even though the optical density is satisfied. In the case where the optical density is reduced even though the image fixing property is satisfied, it is considered that the pigment aggregates insufficiently to give a small particle size and, the pigment is permeated into the recorded material by the action of a surfactant. On the other hand, in the case where the image fixing property is deteriorated even though the optical density is satisfied, it is presumed that the pigment aggregate is increased in the particle size, as a result, the aggregate can hardly permeate into the recorded material. The number of particles having a particle size of 0.5 $\mu$m or more present in 1 l of the recording material is preferably $2.5 \times 10^{11}$ or more, more preferably $5 \times 10^1$ or more, and the number of particles having a particle size of 5 $\mu$m or more present in 1 l of the recording material is preferably $5 \times 10^9$ or more, more preferably $1 \times 10^1$ or more.

In the present invention, the number of particles having a particle size of 0.5 $\mu$m or more in the recording material and the number of particles having a particle size of 5 $\mu$m or more were determined as follows. The colorless or pale solution and the ink each weighed such that the ratio therebetween becomes 1:1 were mixed and the mixed solution under stirring was weighed to 2 $\mu$l and determined on the number of particles using a measurement apparatus, Accusizer TM770 Optical Particle Sizer (manufactured by Particle Sizing Systems). The density of dispersed particles as a parameter inputted at the measurement was the density of pigment.

Molar Ratio of Surfactant to Electrolyte in the Recording Material

The molar ratio of the surfactant to the electrolyte in the recording material of the present invention is preferably from 1:1 to 1:15, more preferably from 1:1 to 1:10, still more preferably from 1:2 to 1:8. If the molar ratio of the surfactant to the electrolyte exceeds 1:15, the optical density may be deteriorated. This is considered to occur because the effect of aggregating the pigment is larger than the effect of permeating the pigment or pigment aggregate. On the other hand, if the molar ratio of the surfactant to the electrolyte is less than 1:1, a sufficiently high image fixing property may not be obtained. This is considered to occur because the effect of impregnating the pigment or pigment aggregate is larger than the effect of the pigment.

In the present invention, the molecular weight of the surfactant is a weight average molecular weight measured by the GPC (gel permeation chromatography) method.

The recording material of the present invention may form an image by performing the recording using a thermal ink jet recording system.

As the recording apparatus which can be used for the image formation, not only a usual ink jet recording apparatus but also a recording apparatus having mounted thereon a heater for controlling the driving of the ink or a recording apparatus having mounted thereon an intermediate transfer mechanism in which the recording material is printed on the intermediate and then transferred onto a recording medium such as paper may be used.

The colorless or pale solution and the ink may be coated simultaneously but it may also be possible to attach a colorless or pale solution to a recording medium and thereafter attach the ink to the recording medium or to attach the ink to a recording medium and thereafter attach a colorless or pale solution to the recording medium.

The ratio in the amount of the colorless or pale solution to the ink coated is preferably from 2:1 to 1:10. If the amount of colorless or pale solution coated is less than 1:10 times the amount of ink coated, the effect of the present invention may not be sufficiently brought out, whereas if the amount of the colorless or pale solution coated is exceeds 2 times the amount of ink coated, curling or cockle of paper is generated.

In the printing of a solid image having an image area ratio of 100% on FX-L paper (produced by Fuji Xerox Co.) using the recording material of the present invention, when the drying time is 5 seconds or less, the effect of the present invention can be obtained. If the drying time exceeds 5 seconds, the image fixing property is inferior in some cases though the optical density is sufficiently high. This is presumed to occur because the permeating action is weak and the permeation of pigment aggregate into the recorded material insufficiently proceeds. The drying time is determined by impressing white FX-L paper on a printed surface under a load of $9.8 \times 10^3$ N/m$^2$ and measuring the time until the ink does not transfer to the FX-L paper side.

The recording material of the present invention may be used in combination with a dye ink or the like at the full color recording and the like. In this case, the colorless or pale solution constituting the recording material of the present invention may be superposed on the dye image.

According to the recording material of the present invention, high optical density and good image fixing property can be simultaneously obtained. This effect is presumed to be brought out because of the reasons stated below. In the ink used in the recording material of the present invention, the dispersion stability of the pigment is maintained by the action of electrostatic repulsion of electric charge on the pigment surface. However, in the recording material constituted by the ink and the colorless or pale solution, the following phenomena 1 to 4 take place.

1. The electrostatic repulsion of the pigment is reduced by the action of electrolyte contained in the colorless or pale solution to cause aggregation of the pigment. In particular, when the electrolyte is a multivalent metal, the attenuation of the electrostatic resilience is outstanding and the aggregation of pigment is accelerated.

2. The anionic compound becomes water-insoluble by the action of electrolyte contained in the colorless or pale solution. In particular, when the electrolyte is a multivalent metal and the anionic compound contains a carboxyl group, the carboxyl group and the multivalent metal forms a cross-linked structure and the anionic compound is liable to be water-insoluble.

3. Due to the actions in 1 and 2 above, aggregates of pigment and anionic compound are formed.

4. The aggregates in 3 above permeate into a recording medium by the action of the surfactant contained in the recording material.

By controlling this aggregation or permeation behavior, high optical density and good image fixing property can be achieved simultaneously. The aggregation or permeation behavior can be controlled by adjusting the relationship between the particle size and the particle number in the colorless or pale solution, the electric conductivity of the colorless or pale solution, the molar ratio of surfactant to electrolyte, the number average particle size and the volume average particle size of dispersed particles in the ink, and the viscosity of the ink.

The present invention is described in greater detail below by referring to the Examples.

Production Method of Colorless or Pale Solution

Colorless or Pale Solutions A to I and A' to H' were obtained by mixing and dissolving respective components shown below and then filtering each mixed solution through a 0.45-$\mu$m filter.

Colorless or Pale Solution A

| | |
|---|---|
| Diglycerin ethylene oxide adduct | 10 parts by weight |
| Calcium nitrate tetrahydrate | 3 parts by weight |
| Surfactant (SURFYNOL 465, produced by Nisshin Kagaku) | 3 parts by weight |
| Isopropyl alcohol | 3 parts by weight |
| Ion exchanged water | balance |
| Total | 100 parts by weight |

This colorless or pale solution had an electric conductivity of 1.3 S/m.

Colorless or Pale Solution B

| | |
|---|---|
| Diethylene glycol monobutyl ether | 10 parts by weight |
| Magnesium acetate tetrahydrate | 1 part by weight |
| Surfactant (SURFYNOL 485, produced by Nisshin Kagaku) | 2 parts by weight |
| Urea | 3 parts by weight |
| Ion exchanged water | balance |
| Total | 100 parts by weight |

This colorless or pale solution had an electric conductivity of 0.8 S/m.

Colorless or Pale Solution C

| | |
|---|---|
| Diethylene glycol | 10 parts by weight |
| Calcium nitrate tetrahydrate | 10 parts by weight |
| Surfactant (Pluronic PE3100, produced by BASF) | 2 parts by weight |
| Urea | 3 parts by weight |
| Ion exchanged water | balance |
| Total | 100 parts by weight |

This colorless or pale solution had an electric conductivity of 3.3 S/m.

Colorless or Pale Solution D

| | |
|---|---|
| Diethylene glycol | 10 parts by weight |
| Calcium nitrate tetrahydrate | 1 part by weight |
| Surfactant (Pluronic PE3100, produced by BASF) | 10 parts by weight |
| Ion exchanged water | balance |
| Total | 100 parts by weight |

This colorless or pale solution had an electric conductivity of 0.9 S/m.

Colorless or Pale Solution E

| | |
|---|---|
| Diglycerin ethylene oxide adduct | 10 parts by weight |
| Calcium nitrate tetrahydrate | 0.3 part by weight |
| Surfactant | 0.1 part by weight |
| (SURFYNOL 465, produced by Nisshin Kagaku) | |
| Ion exchanged water | balance |
| Total | 100 parts by weight |

This colorless or pale solution had an electric conductivity of 0.15 S/m.

Colorless or Pale Solution F

| | |
|---|---|
| Diglycerin ethylene oxide adduct | 10 parts by weight |
| Benzalkonium chloride | 1.5 parts by weight |
| Surfactant | 1 part by weight |
| (Pluronic PE6400, produced by BASF) | |
| Ion exchanged water | balance |
| Total | 100 parts by weight |

This colorless or pale solution had an electric conductivity of 0.8 S/m.

Colorless or Pale Solution G

| | |
|---|---|
| Glycerin | 10 parts by weight |
| Sodium chloride | 5 parts by weight |
| Surfactant | 5 parts by weight |
| (SURFYNOL 465, produced by Nisshin Kagaku) | |
| Isopropyl alcohol | 3 parts by weight |
| Ion exchanged water | balance |
| Total | 100 parts by weight |

This colorless or pale solution had an electric conductivity of 3.5 S/m.

Colorless or Pale Solution H

| | |
|---|---|
| Diethylene glycol | 10 parts by weight |
| Polyallylamine | 3 parts by weight |
| (PAA-HCl-10L, produced by Nitto Boseki) | |
| Surfactant | 1.1 parts by weight |
| (Pluronic PE3100, produced by BASF) | |
| Ion exchanged water | balance |
| Total | 100 parts by weight |

This colorless or pale solution had an electric conductivity of 0.5 S/m.

Colorless or Pale Solution I

| | |
|---|---|
| Propylene glycol | 10 parts by weight |
| Zinc sulfate heptahydrate | 3 parts by weight |
| Potassium benzoate | 1 part by weight |
| Surfactant | 2 parts by weight |

-continued

| | |
|---|---|
| (NONION E-215, produced by Nippon Oils and Fats) | |
| Isopropyl alcohol | 3 parts by weight |
| Urea | 3 parts by weight |
| Ion exchanged water | balance |
| Total | 100 parts by weight |

This colorless or pale solution had an electric conductivity of 1.6 S/m.

Colorless or Pale Solution A'

| | |
|---|---|
| Diglycerin ethylene oxide adduct | 10 parts by weight |
| Calcium nitrate tetrahydrate | 3 parts by weight |
| Isopropyl alcohol | 3 parts by weight |
| Ion exchanged water | balance |
| Total | 100 parts by weight |

This colorless or pale solution had an electric conductivity of 1.3 S/m.

Colorless or Pale Solution B'

| | |
|---|---|
| Diethylene glycol monobutyl ether | 10 parts by weight |
| Magnesium acetate tetrahydrate | 1 part by weight |
| Urea | 3 parts by weight |
| Ion exchanged water | balance |
| Total | 100 parts by weight |

This colorless or pale solution had an electric conductivity of 0.8 S/m.

Colorless or Pale Solution C'

| | |
|---|---|
| Diethylene glycol | 10 parts by weight |
| Calcium nitrate tetrahydrate | 10 parts by weight |
| Urea | 3 parts by weight |
| Ion exchanged water | balance |
| Total | 100 parts by weight |

This colorless or pale solution had an electric conductivity of 3.3 S/m.

Colorless or Pale Solution D'

| | |
|---|---|
| Diethylene glycol oxide adduct | 10 parts by weight |
| Calcium nitrate tetrahydrate | 0.3 part by weight |
| Ion exchanged water | balance |
| Total | 100 parts by weight |

This colorless or pale solution had an electric0 conductivity of 0.15 S/m.

Colorless or Pale Solution E'

| Diglycerin ethylene oxide adduct | 10 parts by weight |
|---|---|
| Benzalkonium chloride | 1.5 parts by weight |
| Ion exchanged water | balance |
| Total | 100 parts by weight |

This colorless or pale solution had an electric conductivity of 0.8 S/m.

Colorless or Pale Solution F'

| Glycerin | 10 parts by weight |
|---|---|
| Sodium chloride | 3 parts by weight |
| Isopropyl alcohol | 3 parts by weight |
| Ion exchanged water | balance |
| Total | 100 parts by weight |

This colorless or pale solution had an electric conductivity of 3.5 S/m.

Colorless or Pale Solution G'

| Diethylene glycol | 10 parts by weight |
|---|---|
| Polyallylamine (PAA-HCl-10L, produced by Nitto Boseki) | 5 parts by weight |
| Ion exchanged water | balance |
| Total | 100 parts by weight |

This colorless or pale solution had an electric conductivity of 0.5 S/m.

Colorless or Pale Solution H'

| Propylene glycol | 10 parts by weight |
|---|---|
| Zinc sulfate heptahydrate | 3 parts by weight |
| Potassium benzoate | 1 part by weight |
| Surfactant (NONION E-215, produced by Nippon Oils and Fats) | 0.03 part by weight |
| Isopropyl alcohol | 3 parts by weight |
| Urea | 3 parts by weight |
| Ion exchanged water | balance |
| Total | 100 parts by weight |

This colorless or pale solution had an electric conductivity of 1.6 S/m.

Pigment Dispersing Methods 1 to 4 are described below.

Pigment Dispersing Method 1

3 Parts by weight of a pigment dispersant was added to 30 parts by weight of carbon black and ion exchanged water was added thereto to make a total amount of 300 parts by weight. This solution was dispersed using an ultrasonic homogenizer and then centrifuged (8,000 rpm×30 minutes), and 100 parts by weight of the residual moiety was removed. The solution obtained was passed through a 1-μm filter to obtain a pigment dispersion solution.

Pigment Dispersing Method 2

The dispersion solution obtained above was centrifuged (8,000 rpm×30 minutes) by a centrifugal separator and the residual moiety (20% based on the total amount) was removed. The dispersion solution obtained was used as a pigment dispersion solution self-dispersible in water.

Pigment Dispersing Method 3

A pigment subjected to plasma treatment was added to ion exchanged water to have a pigment concentration of 20 wt % and dispersed in a high-pressure homogenizer. The resulting dispersion solution was centrifuged (8,000 rpm×30 minutes) and the residual moiety (20% based on the total amount) was removed.

Ink Producing Method

Inks A to E and A' to F' were obtained by mixing and stirring the pigment, anionic compound, water-soluble organic solvent, water and the like shown below to make a total amount of 100 parts by weight and to have a pigment concentration of 5 wt %, and passing the mixed solution through a 1 μm-filter.

Ink A

According to Pigment Dispersing Method 1 and the Ink Producing Method described above, an ink having the following composition was obtained.

| Carbon black (Black Pearls L, produced by Cabot Corp.) | 5 parts by weight |
|---|---|
| Styrene-methacrylic acid-sodium methacrylate copolymer | 0.5 part by weight |
| Glycerin | 15 parts by weight |
| Surfactant (Pluronic PE6400, produced by BASF) | 0.03 part by weight |
| Isopropyl alcohol | 3 parts by weight |
| Ion exchanged water | balance |
| Total | 100 parts by weight |

This ink had a number average particle size of 31 nm, a volume average particle size of 64 nm and a viscosity of 3.0 mPa.s.

Ink B

According to Pigment Dispersing Method 1 and the Ink Producing Method described above, an ink having the following composition was obtained.

| Carbon black (Raven 1080, produced by Colombian Carbon) | 5 parts by weight |
|---|---|
| Styrene-styrenesulfonic acid-sodium styrenesulfonate copolymer | 0.5 part by weight |
| Diethylene glycol | 5 parts by weight |
| Diglycerin ethylene oxide adduct | 5 parts by weight |
| Surfactant (Pluronic PE31001 produced by BASF) | 0.03 part by weight |
| Isopropyl alcohol | 3 parts by weight |
| Urea | 3 parts by weight |
| Ion exchanged water | balance |
| Total | 100 parts by weight |

This ink had a number average particle size of 53 nm, a volume average particle size of 102 nm and a viscosity of 2.8 mPa.s.

Ink C

According to the Pigment Dispersing Method 2 and Ink Producing Method described above, an ink having the following composition was obtained.

| | |
|---|---|
| Surface-treated pigment (Cab-o-jet-300, produced by Cabot Corp.) | 5 parts by weight |
| Styrene-maleic acid-sodium maleate copolymer | 1 part by weight |
| Diethylene glycol | 10 parts by weight |
| Diglycerin ethylene oxide adduct | 5 parts by weight |
| Isopropyl alcohol | 3 parts by weight |
| Ion exchanged water | balance |
| Total | 100 parts by weight |

This ink had a number average particle size of 31 nm, a volume average particle size of 59 nm and a viscosity of 2.9 mPa.s.

Ink D

According to the Pigment Dispersing Method 2 and Ink Producing Method described above, an ink having the following composition was obtained.

| | |
|---|---|
| Surface-treated pigment (Microjet Black CW-1, produced by Orient) | 5 parts by weight |
| Styrene-methacrylic acid-sodium methacrylate copolymer | 1 part by weight |
| Urea | 3 parts by weight |
| Ion exchanged water | balance |
| Total | 100 parts by weight |

This ink had a number average particle size of 14 nm, a volume average particle size of 28 nm and a viscosity of 1.4 mPa.s.

Ink E

According to the Pigment Dispersing Method 1 and Ink Producing Method described above, an ink having the following composition was obtained.

| | |
|---|---|
| Pigment (C.I. Pigment Blue 15:3) | 4 parts by weight |
| Styrene-acrylic acid-potassium acrylate copolymer | 1.5 parts by weight |
| Diglycerin ethylene oxide adduct | 5 parts by weight |
| Sulfolane | 5 parts by weight |
| Surfactant (NONION E-215, produced by Nippon Oils & Fats) | 0.03 part by weight |
| Ion exchanged water | balance |
| Total | 100 parts by weight |

This ink had a number average particle size of 71 nm, a volume average particle size of 140 nm and a viscosity of 2.8 mPa.s.

Ink A'

According to Pigment Dispersing Method 2 and the Ink Producing Method described above, an ink having the following composition was obtained.

| | |
|---|---|
| Carbon black (Cab-o-jet-300, produced by Cabot Corp.) | 4 parts by weight |
| Styrene-methacrylic acid-sodium methacrylate copolymer | 1 part by weight |
| Diethylene glycol | 10 parts by weight |
| Diglycerin ethylene oxide adduct | 5 parts by weight |
| Surfactant (Pluronic PE6400, produced by BASF) | 5 parts by weight |
| Isopropyl alcohol | 3 parts by weight |
| Ion exchanged water | balance |
| Total | 100 parts by weight |

This ink had a number average particle size of 43 nm, a volume average particle size of 88 nm and a viscosity of 2.4 mPa.s.

Ink B'

According to Pigment Dispersing Method 2 and the Ink Producing Method described above, an ink having the following composition was obtained.

| | |
|---|---|
| Carbon black (Microjet Black CW1, produced by Orient) | 4 parts by weight |
| 2-Ethylhexyl methacrylate-maleic acid-sodium maleate copolymer | 1 part by weight |
| Propylene glycol | 15 parts by weight |
| Surfactant (SURFYNOL 465, produced by Nisshin Kagaku) | 1.5 parts by weight |
| Isopropyl alcohol | 3 parts by weight |
| Urea | 3 parts by weight |
| Ion exchanged water | balance |
| Total | 100 parts by weight |

This ink had a number average particle size of 29 nm, a volume average particle size of 45 nm and a viscosity of 2.3 mPa.s.

Ink C'

According to the Pigment Dispersing Method 2 and Ink Producing Method described above, an ink having the following composition was obtained.

| | |
|---|---|
| Carbon black (Microjet Black CW-1, produced by Orient) | 5 parts by weight |
| Glycerin | 15 parts by weight |
| Surfactant (NONION E-230, produced by Nippon Oils & Fats) | 1.5 parts by weight |
| Isopropyl alcohol | 3 parts by weight |
| Urea | 3 parts by weight |
| Ion exchanged water | balance |
| Total | 100 parts by weight |

This ink had a number average particle size of 27 nm, a volume average particle size of 41 nm and a viscosity of 2.6 mPa.s.

Ink D'

According to the Pigment Dispersing Method 2 and Ink Producing Method described above, an ink having the following composition was obtained.

| | |
|---|---|
| Carbon black (Microjet Black CW-1, produced by Orient) | 5 parts by weight |
| Styrene-methacrylic acid-sodium methacrylate copolymer | 1 part by weight |
| Surfactant (NONION E-215, produced by Nippon Oils & Fats) | 3 parts by weight |
| Urea | 3 parts by weight |
| Ion exchanged water | balance |
| Total | 100 parts by weight |

This ink had a number average particle size of 14 nm, a volume average particle size of 28 nm and a viscosity of 1.4 mPa.s.

Ink E'

According to Pigment Dispersing Method 2 and the Ink Producing Method described above, an ink having the following composition was obtained.

| | |
|---|---|
| Carbon black (Cab-o-jet-300, produced by Cabot Corp.) | 5 parts by weight |
| Styrene-methacrylic acid-sodium methacrylate copolymer | 1 part by weight |
| Diethylene glycol | 10 parts by weight |
| Thiodiethanol | 5 parts by weight |
| Isopropyl alcohol | 3 parts by weight |
| Urea | 3 parts by weight |
| Ion exchanged water | balance |
| Total | 100 parts by weight |

This ink had a number average particle size of 47 nm, a volume average particle size of 95 nm and a viscosity of 2.6 mPa.s.

Ink F'

According to the Pigment Dispersing Method 3 and Ink Producing Method described above, an ink having the following composition was obtained.

| | |
|---|---|
| Surface-treated pigment (C.I. Pigment Blue 15:3) | 4 parts by weight |
| Styrene-acrylic acid-potassium acrylate copolymer | 1.5 parts by weight |
| Diglycerin ethylene oxide adduct | 5 parts by weight |
| Sulfolane | 5 parts by weight |
| Surfactant (NONION E-215, produced by Nippon Oils & Fats) | 3 parts by weight |
| Ion exchanged water | balance |
| Total | 100 parts by weight |

This ink had a number average particle size of 69 nm, a volume average particle size of 138 nm and a viscosity of 2.8 mPa.s.

EXAMPLES 1 TO 6

Recording materials of the present invention were obtained by the combination of a colorless or pale solution and an ink shown in Table 1.

COMPARATIVE EXAMPLES 1 TO 5

Recording materials of the present invention were obtained by the combination-of a colorless or pale solution and an ink shown in Table 2.

EXAMPLES 7 TO 11

Recording materials of the present invention were obtained by the combination of a colorless or pale solution and an ink shown in Table 3.

COMPARATIVE EXAMPLES 6 TO 12

Recording materials of the present invention were obtained by the combination of a colorless or pale solution and an ink shown in Table 4.

TEST EXAMPLE

Recording materials obtained in Examples 1 to 11 and Comparative Examples 1 to 12 were evaluated.

Evaluation Method

A prototype print head of 400 dpi with 160 nozzles was used as a printing apparatus and the colorless or pale solution and the ink were jetted to perform printing. The recording medium used was FX-L paper (produced by Fuji Xerox Co.). Unless otherwise indicated, the printing and evaluation were performed in an ordinary environment (temperature: 23±0.5° C., humidity: 55±5% R.H.).

1) Drying Time

A test ink was filled in a prototype ink cartridge and a solid image having an image area ratio of 100% was printed on FX-L paper (produced by Fuji Xerox Co.) using the above-described prototype ink jet recording apparatus. On the printed surface, white FX-L paper was impressed under a load of $9.8 \times 10^3$ N/m$^2$ and the time until the ink did not transfer to the white FX-L paper side was measured and used as the drying time.

2) Optical Density Fixing Intensity

A test ink was filled in a prototype ink cartridge and a 100% coverage pattern was printed using the above-described prototype ink jet recording apparatus. The recorded matter was left standing for 24 hours in an ordinary environment and then evaluated on the optical density and the fixing intensity.

The optical density was determined by measuring the recorded matter using X-Rite 404 (manufactured by X-RITE) and those having an optical density of 1.4 or more were rated as ◯, 1.3 or more as Δ, and less than 1.3 as X.

The fixing intensity was sensorially evaluated by impressing another white FX-L paper on the recorded matter under a load of $4.9 \times 10^4$ N/m$^2$ and comparing the ink transferred to the white FX-L paper with a previously determined limiting sample.

3) Jetting Stability

The jetting stability was evaluated as follows. After $1 \times 10^8$ pule printing with the colorless or pale solution and the ink, a 100% coverage pattern was printed. The optical density at the initial printing and the optical density after the $1 \times 10^8$ pule printing were measured. When the variation of optical density before and after the $1 \times 10^8$ pule printing was ±5% or less, the recording material was rated as ◯ and when the variation exceeded ±5%, as X.

4) Long-Term Storage Stability

The long-term storage stability was evaluated as follows. The colorless or pale solution and the ink were filled into a cartridge and the cartridge was mounted on a ink jet recording machine. This state was kept in an environment of 40° C. and 50% R.H. for 3 months. Thereafter, printing was performed under ordinary use conditions. When full nozzle printing was performed, the printing material was rated as ○, when print dropping was generated under ordinary use conditions but full nozzle printing could be again performed after repeated vacuum maintenance, as Δ, and when some nozzles could not be recovered merely by the vacuum maintenance, as X.

The results obtained are shown in Tables 1 to 4.

TABLE 1

| Example | Colorless Solution | Ink | Number of Particles of 0.5 μm or more | Number of Particles of 5 μm or more | Drying Time[Note] | Molar ratio of Surfactant to Electrolyte | Optical Density | Image Fixing Property | Jetting Stability | Long-Term Storage Stability |
|---|---|---|---|---|---|---|---|---|---|---|
| 1 | A | A | $6.1 \times 10^{11}$ | $1.5 \times 10^{11}$ | ○ | 1:2.8 | ○ | ○ | ○ | ○ |
| 2 | B | B | $1.7 \times 10^{11}$ | $6.3 \times 10^{10}$ | ○ | 1:3.5 | ○ | ○ | ○ | ○ |
| 3 | C | A | $7.5 \times 10^{11}$ | $5.3 \times 10^{11}$ | ○ | 1:23.2 | ○ | Δ | ○ | Δ |
| 4 | D | A | $4.4 \times 10^{11}$ | $8.9 \times 10^{10}$ | ○ | 2.1:1 | Δ | ○ | ○ | ○ |
| 5 | H | C | $2.4 \times 10^{11}$ | $4.3 \times 10^{10}$ | ○ | 1:1.5 | Δ | ○ | ○ | ○ |
| 6 | I | E | $8.5 \times 10^{11}$ | $2.9 \times 10^{11}$ | ○ | 1:7.9 | ○ | ○ | ○ | ○ |

[Note]When the drying time was 5 seconds or less, rating was o, and when the drying time exceeded 5 seconds, rating was x.

TABLE 2

| Example | Colorless Solution | Ink | Number of Particles of 0.5 μm or more | Number of Particles of 5 μm or more | Drying Time[Note] | Molar ratio of Surfactant to Electrolyte | Optical Density | Image Fixing Property | Jetting Stability | Long-Term Storage Stability |
|---|---|---|---|---|---|---|---|---|---|---|
| 1 | E | C | $4.8 \times 10^{10}$ | $1.2 \times 10^{9}$ | x | 1:8.5 | ○ | x | ○ | ○ |
| 2 | F | A | $6.5 \times 10^{10}$ | $4.8 \times 10^{9}$ | ○ | 1.1:1 | x | ○ | ○ | ○ |
| 3 | G | A | $8.9 \times 10^{10}$ | $7.2 \times 10^{8}$ | ○ | 1:11.4 | x | ○ | x | ○ |
| 4 | D | D | $4.0 \times 10^{11}$ | $9.5 \times 10^{10}$ | ○ | 2.1:1 | x | ○ | ○ | x |
| 5 | none | A | $1.8 \times 10^{10}$ | $4.0 \times 10^{7}$ | x | (electrolyte = 0) | Δ | x | ○ | ○ |

[Note]When the drying time was 5 seconds or less, rating was o, and when the drying time exceeded 5 seconds, rating was x.

TABLE 3

| Example | Colorless Solution | Ink | Number of Particles of 0.5 μm or more | Number of Particles of 5 μm or more | Drying Time[Note] | Molar ratio of Surfactant to Electrolyte | Optical Density | Image Fixing Property | Jetting Stability | Long-Term Storage Stability |
|---|---|---|---|---|---|---|---|---|---|---|
| 7 | A' | A' | $3.5 \times 10^{11}$ | $1.1 \times 10^{11}$ | ○ | 1:7.6 | ○ | ○ | ○ | ○ |
| 8 | B' | B' | $1.8 \times 10^{11}$ | $5.6 \times 10^{11}$ | ○ | 1:2.1 | Δ | ○ | ○ | ○ |
| 9 | C' | A' | $6.2 \times 10^{11}$ | $2.5 \times 10^{11}$ | ○ | 1:25.4 | ○ | Δ | ○ | Δ |
| 10 | G' | B' | $3.2 \times 10^{11}$ | $8.1 \times 10^{10}$ | ○ | 1:1.1 | ○ | ○ | ○ | ○ |
| 11 | H' | F' | $5.9 \times 10^{11}$ | $2.1 \times 10^{11}$ | ○ | 1:5.3 | ○ | ○ | ○ | ○ |

[Note]When the drying time was 5 seconds or less, rating was o, and when the drying time exceeded 5 seconds, rating was x.

TABLE 4

| Comparative Example | Colorless Solution | Ink | Number of Particles of 0.5 μm or more | Number of Particles of 5 μm or more | Drying Time[Note] | Molar ratio of Surfactant to Electrolyte | Optical Density | Image Fixing Property | Jetting Stability | Long-Term Storage Stability |
|---|---|---|---|---|---|---|---|---|---|---|
| 6 | D' | B' | $8.9 \times 10^{10}$ | $8.5 \times 10^{8}$ | ○ | 1.8:1 | x | ○ | ○ | ○ |
| 7 | E' | B' | $2.5 \times 10^{10}$ | $1.8 \times 10^{9}$ | ○ | 1:2.0 | x | ○ | ○ | ○ |
| 8 | F' | B' | $5.2 \times 10^{10}$ | $6.1 \times 10^{8}$ | ○ | 1:22.8 | x | ○ | x | ○ |
| 9 | A' | C' | $9.1 \times 10^{10}$ | $3.5 \times 10^{9}$ | ○ | 1:13.4 | x | ○ | ○ | ○ |
| 10 | A' | D' | $1.6 \times 10^{11}$ | $5.9 \times 10^{10}$ | ○ | 1:3.9 | Δ | ○ | ○ | x |
| 11 | A' | E' | $4.1 \times 10^{11}$ | $1.5 \times 10^{11}$ | x | (surfactant = 0) | ○ | x | ○ | ○ |
| 12 | none | A' | $4.5 \times 10^{10}$ | $1.5 \times 10^{7}$ | ○ | (electrolyte = 0) | x | ○ | ○ | ○ |

[Note]When the drying time was 5 seconds or less, rating was o, and when the drying time exceeded 5 seconds, rating was x.

As apparent from the results shown in Tables 1 to 4, when the recording materials obtained in Examples 1 to 11 were used, the drying time was less than 5 seconds in all cases and the optical density, image fixing property, jetting stability and long-term storage stability were excellent. On the other hand, when the recording materials obtained in Comparative Examples 1 to 12 were used, those satisfying all properties could not be obtained.

As described in the foregoing, according to the present invention, a recording material exhibiting high optical density and excellent image fixing property and moreover, favored with excellent long-term storage stability and superior jetting stability, as well as an image forming method using the recording material can be obtained.

What is claimed is:

1. A recording material comprising a colorless or pale solution containing an electrolyte, a water-soluble organic solvent and water, and an ink containing a pigment, an anionic compound, a water-soluble organic solvent and water, wherein the number of particles of 0.5 µm or more present in 1liter of the recording material is $1\times10^{11}$ or more, and the number of particles of 5 µm or more is $1\times10^9$ or more, and wherein the drying time of the recording material is 5 seconds or less when a solid image having an image area ratio of 100% is printed on a plain paper.

2. The recording material as claimed in claim 1, wherein the electrolyte in said colorless or pale solution is a multivalent metal salt, an alkali metal salt or a cationic substance.

3. The recording material as claimed in claim 1, wherein the, colorless or pale solution contains a surfactant and the ink contains a dispersant.

4. The recording material as claimed in claim 1, wherein the ink contains a surfactant and the pigment is a self-dispersible pigment in water.

5. The recording material as claimed in claim 3, wherein the molar ratio of the surfactant to the electrolyte in said recording material is from 1:1 to 1:15.

6. The recording material as claimed in claim 1, wherein the pigment particles dispersed in said ink have a number average particle size of from 15 to 100 nm and a volume average particle size of from 30 to 200 nm.

7. The recording material as claimed in claim 1, wherein said colorless or pale solution has an electric conductivity of from 0.5 to 3.0 S/m.

8. The recording material as claimed in claim 1, wherein said ink has a viscosity of from 1.5 to 6.0 mPa.s.

9. The recording material as claimed in claim 1, wherein the anionic compound in said ink comprises a hydrophilic group and a hydrophobic group and contains a carboxyl group as a hydrophilic functional group.

10. The recording material as claimed in claim 8, wherein the anionic compound in said ink comprises a hydrophilic group and a hydrophobic group and the hydrophilic group is selected from the group consisting of acrylic acid, a methacrylic acid and maleic acid (anhydride).

11. The recording material as claimed in claim 8, wherein the anionic compound in said ink comprises a hydrophilic group and a hydrophobic group and the hydrophobic group is selected from the group consisting of styrene and an alkyl, aryl or alkylaryl ester of (meth)acrylic acid.

12. The recording material as claimed in claim 1, wherein said pigment is carbon black.

13. The recording material as claimed in claim 1, wherein said pigment is a color pigment.

14. The recording material as claimed in claim 1, wherein said colorless or pale solution contains a carboxylic acid or a salt of carboxylic acid.

15. The recording material as claimed in claim 1, wherein the ink contains two weight percent or less of the anionic compound.

16. A method for forming an image, comprising applying the recording material of claim 1 to a recording medium with a thermal ink jet recording system.

17. The image forming method as claimed in claim 16, wherein a colorless or pale solution is attached to a recording medium and then an ink is attached to the recording medium.

18. The image forming method as claimed in claim 16, wherein an ink is attached to a recording medium and then a colorless or pale solution is attached to the recording medium.

* * * * *

UNITED STATES PATENT AND TRADEMARK OFFICE
CERTIFICATE OF CORRECTION

PATENT NO. : 6,261,353 B1
DATED : July 17, 2001
INVENTOR(S) : Takatsugu Doi et al.

It is certified that error appears in the above-identified patent and that said Letters Patent is hereby corrected as shown below:

<u>Title page,</u>
Item [73] Assignee, "LTD" should read -- Ltd --.
Item [57] ABSTRACT, line 6, "1 L" should read -- 1 1 --.

<u>Column 27, claim 1,</u>
Line 21, "1liter" should read -- 1 liter --.

<u>Column 27, claim 3,</u>
Line 30, "the, colorless" should read -- the colorless --.

<u>Column 28, claim 8,</u>
Line 5, "6.0 mPa.s" should read -- 6.0 mPa•s --.

Signed and Sealed this

Second Day of April, 2002

Attest:

JAMES E. ROGAN
*Attesting Officer*     *Director of the United States Patent and Trademark Office*